Jan. 26, 1960     O. F. MARSTON     2,922,466
SEAT CUSHION
Filed June 2, 1958     2 Sheets-Sheet 1
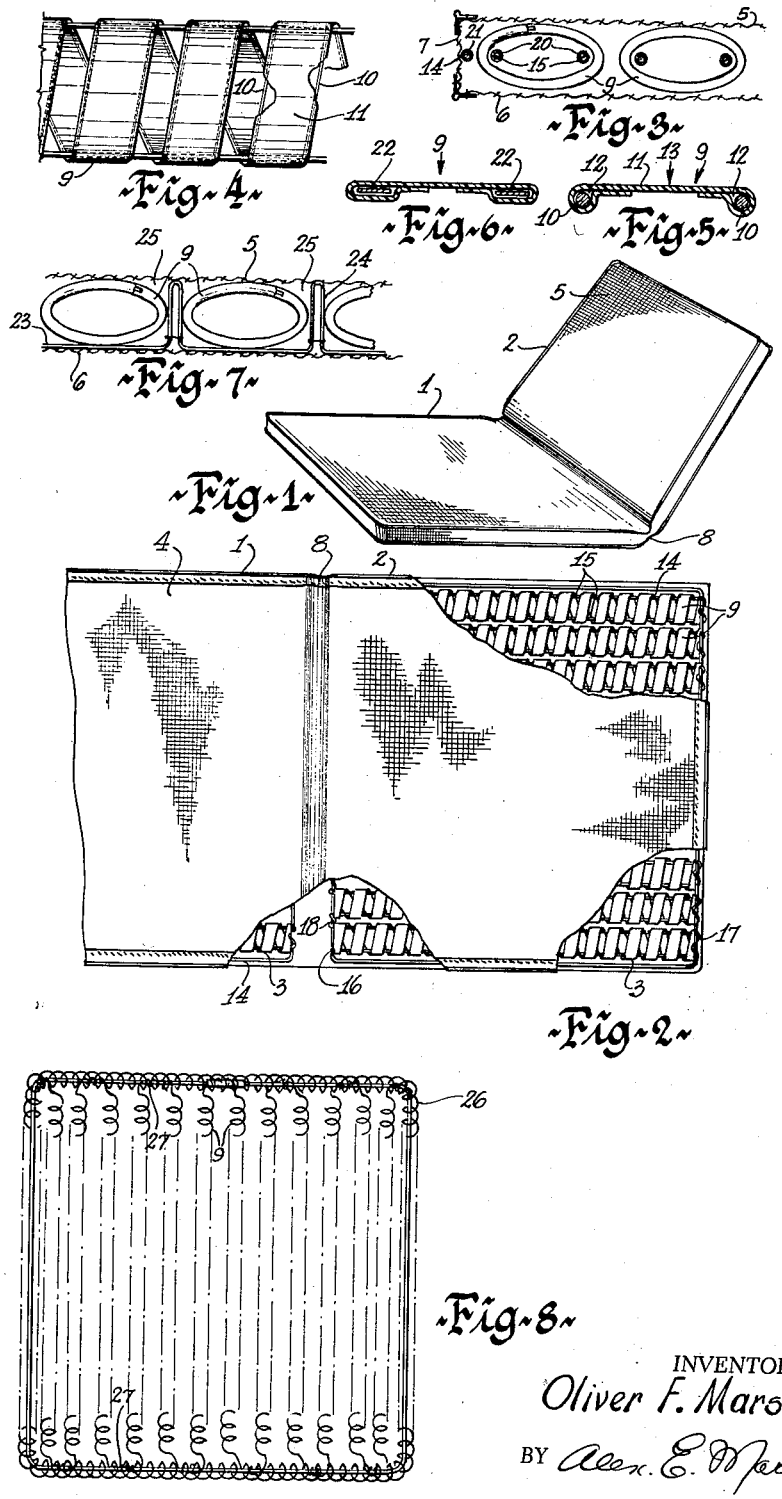
INVENTOR
Oliver F. Marston
BY Alex. E. MacRae
ATTORNEY Jan. 26, 1960 O. F. MARSTON 2,922,466
SEAT CUSHION
Filed June 2, 1958 2 Sheets-Sheet 2
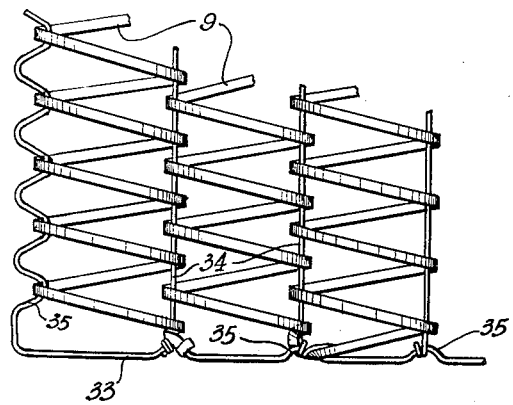
Fig-11
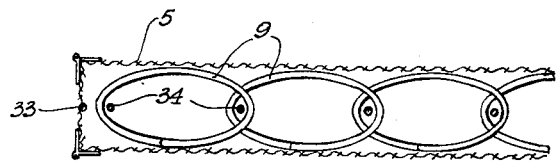
Fig-12
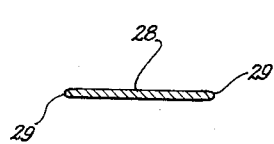 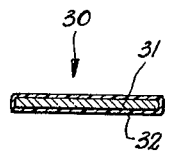
Fig-9 Fig-10
INVENTOR
Oliver F. Marston
BY
ATTORNEY United States Patent Office 2,922,466
Patented Jan. 26, 1960

2,922,466
SEAT CUSHION
Oliver F. Marston, Richmond, Va.
Application June 2, 1958, Serial No. 739,033
11 Claims. (Cl. 155—182)

This invention relates to seat cushions.

A seat cushion in general use in the United States and used primarily as a ventilating cushion on the top of an automobile seat comprises a woven soft wire filler encased in a low cost cover of open weave material such as paper yarn. In this type of cushion, the woven wire body actually acts as a spacer for passage of air between the open weave cover portions and depends upon the underlying seat cushion for spring action. Because of the low cost of the article and the required ease of weaving the wire, it is necessarily of low carbon content and possesses a low spring action characteristic. The cover is adapted to distribute the weight of the user over a wide area of the enclosed wire body whereby the latter will support such weight. The wire employed is of single strand uncovered nature and its ends require crimping to the cushion frame. This is unsatisfactory since, in time, the wire ends become loose and penetrate the clothes and person of the user. Furthermore, the wire is subject to breakage after constant flexing and the broken ends also present a hazard. Should the cushion be exposed to moisture, the wire tends to rust making the cushion substantially unusable. Moreover, the pressure of the single strand wires against the low cost cover material during use causes rapid wear of the latter by abrasion. Broken or loose wire ends also result in damage to the cover material.

It is an object of this invention to provide a seat cushion of the ventilating type which is of simple and inexpensive manufacture but which possesses inherent resiliency for added comfort during use and for maintenance of its original shape.

Another object is to provide a seat cushion of the ventilating type having a spring wire body structure which is capable of withstanding long and continued use without damage to itself or to the cover thereof.

Another object is to provide a seat cushion of the ventilating type which is substantially waterproof whereby it suffers no injury on exposure to moisture.

The invention broadly resides in a seat cushion having a resilient body and a cover therefor, said body comprising a plurality of strips each arranged in the form of a helical coil having spaced convolutions, said coils being arranged in laterally disposed relation, each said strip having a flat outer surface for engagement by said cover.

Other objects, advantages and details of the invention will become apparent from the following description, with particular reference to the accompanying drawing, in which Figure 1 is a perspective view of a cushion in accordance with the invention, Figure 2 is a partial plan view, partly broken away, of the cushion, Figure 3 is a partial sectional end elevation of the cushion, Figure 4 is a partial plan view of a coiled strip, Figure 5 is a cross-sectional view of the coiled strip, Figure 6 is a cross-sectional view of a modified form of strip, Figure 7 is a partial sectional end elevation of a modified form of cushion, Figure 8 is a plan view, in diagrammatic form, of another modified cushion structure, Figure 9 is a cross-sectional view of a modified form of strip, Figure 10 is a cross-sectional view of still another form of strip, Figure 11 is a partial plan view of a modified form of cushion structure, and Figure 12 is a partial sectional end elevation of a cushion structure as illustrated in Figure 11.

Referring to Figures 1 to 5, the cushion shown comprises a seat portion 1 and a back portion 2, each having a resilient body 3 provided with a covering 4 of any suitable perforate or open weave material. Preferably, however, such material is of waterproof nature and may, for instance, be composed of yarns or threads of plastic composition such as vinylidene chloride, tetrafluoroethylene, or polyethylene. As shown, the covering 4 has a top section 5, a bottom section 6, and an edge section 7, which extend continuously over the seat and back portions of the cushion whereby the intermediate portion 8 of the covering constitutes a hinge connection between the seat and back portions 1 and 2.

Each resilient body 3 comprises a plurality of coiled strips 9. Each strip 9 is broad and substantially flat has a flat outer surface for engagement with covering 4 and for convenient and comfortable reception of the weight to be placed on the cushion. In the modification shown, each strip 9 comprises a pair of wires 10 of spring steel or the like arranged in spaced parallel relation and connected together by means of a web 11 preferably formed of a thermoplastic composition such as polyvinyl acetate, polyethylene, or other suitable waterproof, semi-rigid but pliable material. As shown, the edge portions of the web 11 are doubled around the wires 10 and heat sealed or otherwise secured to the under surface of the web to fully enclose the wires which thus impart additional rigidity to the edges of the web. Preferably, the wires 10 have some slight play in the enclosed tubular spaces 12 provided in the web for reception of wires whereby the latter have limited freedom of movement therein. As clearly shown in Figure 5, the upper surface 13 of the strip is substantially flat and uninterrupted.

Each strip 9 is formed into a helical coil which, in cross-section, is preferably elliptical to provide broadened side surfaces. The convolutions of the coil are in slightly spaced relation as shown.

The coiled strips 9 are arranged in substantially parallel relation in a rectangular or square frame 14 composed of heavy metal wire or rod. One means for mounting the strips 9 in the frame is shown and comprises a pair of stay wires 15 for each strip. The ends of the stay wires are secured to the frame 14. As illustrated, the stay wires 15 may be formed from a continuous length of wire, one end of which is fixed to the frame and the connecting portions between the stays 15 being looped around the frame as indicated at 17 and 18. The other end of the length of wire (not shown) is also fixed to the frame. The stay wires 15 of each pair are spaced apart a distance approximately equal to the widest interior cross-sectional dimension of the coil strip 9 whereby they engage the narrow edge surfaces of the coil, as clearly shown in Figure 3.

The stay wires 15 and frame wire 14 are covered with waterproof coatings 20 and 21 of rubber, plastic composition or the like.

It will be apparent that use of the flattened elliptical coil strips 9 in the resilient body 3 will provide great comfort and resistance to wear and injury in use. It provides free circulation of air around and through the convolutions of each coil and the open weave of the covering. Such circulation of air is enhanced by the spring action of the coil strips as they are compressed and released thereby increasing the cooling efficiency of the entire cushion. Since the cushion is completely waterproof, exposure to moisture exerts no damaging effect thereon.

While dimensions may vary widely, a satisfactory size of coil has an exterior width of approximately two inches and an exterior depth or thickness of approximately one inch. The coil strips may be spaced apart from one-eighth to one-quarter inch. The strip 9 may have a width of about one inch and each convolution may be spaced from the adjacent convolution about one-half inch.

Figure 6 illustrates a slightly modified form of strip 9 wherein, instead of round wires 10, flat spring steel straps or wires 22 are employed.

Figure 7 illustrates a modified form of resilient body 3 wherein instead of frame 14 and stays 15, a frame 23 is employed. Frame 23 comprises a sheet of plastic composition material such as vinylidene chloride, polyethylene or the like having formed therein a plurality of parallel upright ribs 24 producing therebetween channels 25 for reception of the coil strips 9.

Figure 8 illustrates diagrammatically still another manner of assembling the coil strips 9 into a resilient body. In this instance, a coil strip 26 (of similar formation to that of coil strip 9) extends about frame 14 throughout the length thereof, the ends of strip 26 being tied together to produce a continuous coil. The ends of the coil strips 9 may be simply secured to the frame 14 without use of stay wires. Alternatively, as shown, coil strips 9 may form part of a continuous coil strip which is looped at 27 around the frame and through coil strip 26.

It will be apparent that the stay wires 15 may be of rodlike form, i.e., of sufficiently large diameter that they will prevent unduly great compression of the coil strips. It will also be apparent that the stay 15 and frame wire 14 may be of uncovered form but of rustless material such as stainless steel.

Figure 9 illustrates an alternative form of metal band 28 which may be utilized to form the coil strip instead of the forms illustrated in Figures 5 and 6. As shown, the band 28 is flat and uncovered and is formed of rustless spring metal such as stainless spring steel. Preferably the edges 29 of the band are rounded to avoid cutting of covering material.

Figure 10 illustrates still another alternative form of band 30 which may be utilized to form the coil strip. In this instance, a flat metal strip 31 is covered with a plastic composition coating 32.

Referring to Figures 11 and 12, the cushion structure shown comprises a frame 33 and stays 34 composed of wires or rods of covered or uncovered spring metal such as stainless steel or the like. Preferably the frame 33 is provided with corrugations or inwardly directed bends 35. The ends of stays 34 are anchored in opposed bends 35. The coiled strips 9 are arranged in slightly overlapping position with the loops of adjacent coils extending around the same stay 34. Each edge strip 9 has each of its convolutions seated in a bend 35 to rigidly secure it in position. It will be understood that, as shown, the coiled strips 9 may consist of one continuous strip.

As previously indicated each strip or band 9, 28 or 30 is broad and substantially flat. It may range in width from ¼ to 1 inch or more. Preferably, it will have a width at least many times its thickness. Thus, its overall thickness will not ordinarily be more than 1/16 to 1/8 inch.

I claim:

1. A seat cushion having a resilient body and a cover therefor, said body comprising a plurality of coiled strips in laterally spaced relation, each said coiled strip comprising a pair of spaced substantially parallel wires and a connecting web of plastic composition material having each of its edge portions enclosing one of said wires.

2. In a seat cushion having a resilient body and a cover therefor, said body comprising a plurality of strips each arranged in the form of a helical coil, each said strip comprising a pair of spaced substantially parallel wires and a connecting web of plastic composition material having each of its edge portions enclosing one of said wires, said coil being of elliptical form in cross-section and having spaced convolutions.

3. A seat cushion as defined in claim 2, each said wire having limited freedom of movement in said edge portion.

4. A seat cushion as defined in claim 2, each said wire being composed of flat spring steel.

5. A seat cushion comprising a resilient body, and a perforate covering for said body, said body comprising a rectangular wire frame, a plurality of substantially parallel strips each arranged in the form of a helical coil, each said strip comprising a pair of spaced substantially parallel wires and a connecting web of plastic composition having each of its edge portions enclosing one of said wires, said coil being of elliptical form in cross-section, and means for mounting said coils in said frame comprising a pair of wire stays extending through each said coil and fixed to the frame.

6. A seat cushion as defined in claim 5, said covering being of waterproof material and each of said wire frame and wire stays having thereon a coating of waterproof material.

7. A seat cushion comprising a resilient body, and a perforate covering for said body, said body comprising a rectangular wire frame having a coating thereon of waterproof material, a helically coiled strip extending around said frame throughout the length thereof, and a plurality of substantially parallel helically coiled strips having their ends secured to said frame, each of said coiled strips comprising a pair of spaced substantially parallel wires and a connecting web of plastic composition material having each of its edge portions enclosing one of said wires.

8. A seat cushion comprising a resilient body, and a perforate waterproof covering for said body, said body comprising a frame member of plastic composition material having therein a plurality of substantially parallel channels, and a helically coiled strip disposed in each of said channels, each of said coiled strips comprising a pair of spaced substantially parallel wires and a connecting web of plastic composition material having each of its edge portions enclosing one of said wires.

9. A seat cushion having a resilient body and a cover therefor, said body comprising a four-sided frame of rodlike spring metal, a plurality of stays of rodlike spring metal each having its ends secured to opposite sides of said frame, and a plurality of strips each arranged in the form of a helical coil having spaced convolutions, said coils being arranged in laterally disposed relation, each said convolution being of preformed elliptical shape in cross-section and having its major axis in substantially parallel relation to said cover, each said strip being composed of flat spring material and having a flat outer surface for engagement by said cover, each said coil having each of its convolutions extending around at least one of said stays, each of said stays extending through the convolutions of two of said coils.

10. A seat cushion as defined in claim 9, each of the outer ones of said coils having its convolutions also extending around another side of said frame.

11. A seat cushion as defined in claim 10, said frame having corrugations therein for reception of the ends of said stays and for reception of the convolutions of said outer ones of said coils.

References Cited in the file of this patent

UNITED STATES PATENTS

| | | |
|---|---|---|
| 2,361,167 | Backus | Oct. 24, 1944 |
| 2,801,679 | Crane | Aug. 6, 1957 |